Nov. 15, 1927.
H. F. DYCK
1,649,673
GAS LINE COUPLING
Filed Dec. 30, 1926
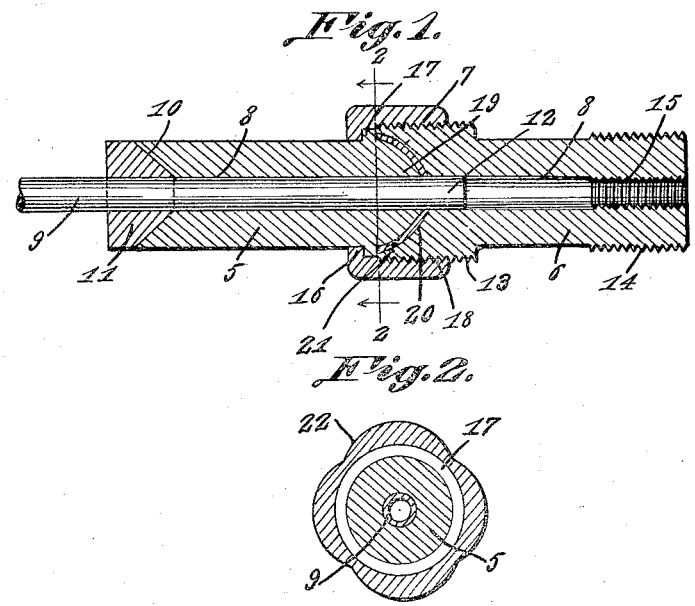
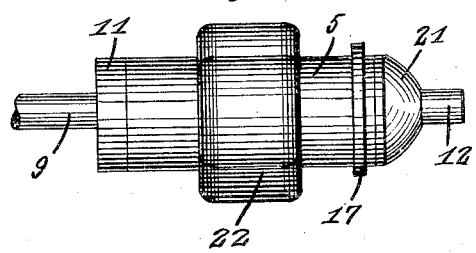
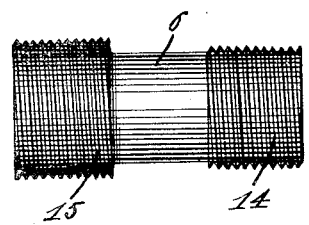
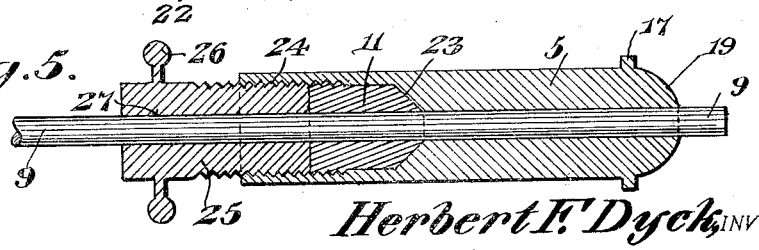
Herbert F. Dyck, INVENTOR.
BY
Geo. P. Kimmel, ATTORNEY.

Patented Nov. 15, 1927.

1,649,673

UNITED STATES PATENT OFFICE.

HERBERT F. DYCK, OF NESS CITY, KANSAS.

GAS-LINE COUPLING.

Application filed December 30, 1926. Serial No. 158,009.

This invention relates to a coupling and more especially to the class of fluid line couplings.

The primary object of the invention is the provision of a coupling of this character, wherein sections of a fluid line can be detachably joined, without liability of leakage at the juncture, the coupling members of the male and female type being of novel form, so that the same can be coupled and uncoupled with dispatch and when coupled will insure a fluid-tight joint without liability of leakage at this point.

Another object of the invention is the provision of a coupling of this character, wherein the male and female members inter-fit with each other and a sleeve detachably joins such members together to hold the sections of the pipe in longitudinal alignment, the pipe section at one end of the coupling being inserted in one member and made fast therein, with a portion of the extremity of the pipe projected so as to constitute a nose to be received in the other member beyond the point of juncture of the members of the coupling, thus insuring a positive non-leaking joint, the members of the coupling being of unique form to insure ready connection and disconnection of the parts of the coupling.

A further object of the invention is the provision of a coupling of this character which is extremely simple in its construction, possessing of but few parts adapted to be interfitted with each other to effect a positive seal tight juncture or joint between sections of a pipe line for gas or other fluids, thoroughly reliable and efficient in its purpose, strong, durable and inexpensive to manufacture and install.

With these and other objects in view the invention consists in the features of construction, combination and arrangement of parts, as will be hereinafter fully described, illustrated in the accompanying drawing and pointed out in the claims hereunto appended.

In the accompanying drawing:

Figure 1 is a vertical longitudinal sectional view through the coupling, showing one pipe section held fast in one member of such coupling constructed in accordance with the invention.

Figure 2 is a sectional view on the line 2—2 of Figure 1 looking in the direction of the arrows.

Figure 3 is a side elevation of the male member of the coupling.

Figure 4 is a side elevation of the female member of the coupling.

Figure 5 is a vertical longitudinal sectional view showing a slight modification of the invention.

Similar reference characters indicate corresponding parts throughout the several views in the drawing.

Referring to the drawing in detail, the coupling comprises a male member 5, a female member 6, and a locking sleeve 7. The members 5 and 6 preferably are of circular cross section and each is provided with a central circular bore or passage 8, which align with one another axially when said members are brought together and joined.

The male member has fitted in its bore 8 a tube or pipe section 9, the outer end of said member 5 being countersunk or recessed as at 10 into which is adapted to be forced or otherwise introduced solder 11 which also adheres to the wall of the recess or countersink and to the external surface of the pipe or tube 9 so as to make the latter fast within the male member 5. This pipe or tube 9 at its extremity 12 protrudes beyond the member 5 to telescope within the bore or passage 8 in the female member 6 as is clearly shown in Figure 1 of the drawing.

The female member 6 is provided with external threaded portions 13 and 14, respectively, at opposite ends thereof, while the bore or passage 8 for a distance of the outer end of the same is provided with screw threads 15, these being internally of the member 6 so that a pipe section can be tapped or screwed within the said female member 6. If desired this female member 6 can be tapped or screwed into the pipe in the use of the threads 14 as will be clearly understood.

Loosely surrounding the male member 5 is the collar which is formed at one end with an inwardly extending annular flange 16 adapted to abut an external annular shoulder 17 formed on the male member 5, the shoulder 17 being confined within the sleeve or shell 7, which is provided with internal screw threads 18 to coact with the threads 15 on the female member, so that both the male and female members 5 and 6 can be detachably connected together in the use of the coupling as is clearly illustrated in Figure 1 of the drawing.

The male member 5 at its juncture end with the female member 6 is formed with a substantially semi-spherical shaped head or tip 19 which is adapted to be received into a correspondingly shaped seat or recess 20 formed in the female member 6 at the juncture end thereof.

Adapted to be carried by the tip or head 19 is a compressible washer 21 shaped correspondingly to the tip or head so that on the joining of the male and female members 5 and 6, the said washer 21 can be compressed at the juncture terminals of these members when coupled together so as to provide a fluid-tight joint therebetween.

The sleeve or collar 7 is formed with an externally deformed surface 22 so that it can be manually turned for the coupling of the members 5 and 6 or the disconnection thereof with these without liability of the slippage of the hand or an implement as applied to the collar or sleeve.

In Figure 5 of the drawing there is shown a slight modification of the invention, wherein the recessed end 23, of the male member 5 is internally threaded at 24, for the adjustable engagement therein, of a screw plug 25, which compresses the solder 11, in this instance being paste metal and air hardened, within the recess 23. This plug 25 is formed at its outer end with finger knots 26, whereby it may be manually turned in and out of the male member 5. Said plug 25 is also provided with a central passage 27, to accommodate the tube 9, so that the plug 25 will encircle the latter. By compressing the solder 11 of the paste character it will be caused to adhere to the tube and within the recess in the male member, thereby rendering these parts unitary.

In the use of the coupling, it is understood that the pipe sections are joined to the male and female members 5 and 6, and these members are brought together in alignment with each other, the sleeve or collar 7 is rotated in a direction to screw upon the female member 6 and by the working of the collar or sleeve home these members are united together to effect a fluid-tight joint therebetween by sealing the juncture between the head 16 and the seat 20 on and in the male and female members 5 and 6, respectively.

From the foregoing it is thought that the construction and manner of operation of the device will be clearly understood and therefore a more extended explanation has been omitted.

What I claim is:—

1. In a coupling of the character described, a male member having a substantially semi-spherical shaped head at one end and a recess in its other end, a female member having a seat correspondingly shaped to the head for receiving the same, a pipe section passed centrally through the male member and having one end projected beyond the head to telescope within the female member, adhering means within the recess in the male member for securing the pipe section therein, and means loosely carried by the male member and engageable with the female member to lock said members together.

2. In a coupling of the character described, a male member having a substantially semi-spherical shaped head at one end and a recess in its other end, a female member having a seat correspondingly shaped to the head for receiving the same, a pipe section passed centrally through the male member and having one end projected beyond the head to telescope within the female member, adhering means within the recess in the male member for securing the pipe section therein, means loosely carried by the male member and engageable with the female member to lock said members together, and compressible means between the head and the female member and adapted to be received in the seat in the latter.

3. In a coupling of the character described, a male member having a substantially semi-spherical shaped head at one end and a recess in its other end, a female member having a seat correspondingly shaped to the head for receiving the same, a pipe section passed centrally through the male member and having one end projected beyond the head to telescope within the female member, adhering means within the recess in the male member for securing the pipe section therein, an annular rib formed exteriorly on the male member contiguous to its head, and a collar slidably fitted on the male member and adapted to abut the rib and detachably engageable with the female member externally thereof for the joining of the male and female members together.

4. In a coupling of the character described, a male member having a substantially semi-spherical shaped head at one end and a recess in its other end, a female member having a seat correspondingly shaped to the head for receiving the same, a pipe section passed centrally through the male member and having one end projected beyond the head to telescope within the female member, adhering means within the recess in the male member for securing the pipe section therein, an annular rib formed exteriorly on the male member contiguous to its head, a collar slidably fitted on the male member and adapted to abut the rib and detachably engageable with the female member externally thereof for the joining of the male and female members together, and means on the female member for the joining of a pipe section thereto.

In testimony whereof, I affix my signature hereto.

HERBERT F. DYCK.